(12) United States Patent
Barba et al.

(10) Patent No.: US 9,995,196 B2
(45) Date of Patent: Jun. 12, 2018

(54) METHOD OF OPERATING AN AFTERTREATMENT SYSTEM OF AN INTERNAL COMBUSTION ENGINE

(71) Applicant: GM GLOBAL TECHNOLOGY OPERATIONS LLC, Detroit, MI (US)

(72) Inventors: Francesco Barba, Sorrento (IT); Roberto Romanato, Settimo Torinese (IT); Paolo Olmo, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 15/375,960

(22) Filed: Dec. 12, 2016

(65) Prior Publication Data

US 2017/0167346 A1    Jun. 15, 2017

(30) Foreign Application Priority Data

Dec. 10, 2015   (GB) .................................. 1521847.2

(51) Int. Cl.
*F01N 3/00*     (2006.01)
*F01N 9/00*     (2006.01)
(Continued)

(52) U.S. Cl.
CPC ........... *F01N 9/00* (2013.01); *B01D 53/0454* (2013.01); *B01D 53/9481* (2013.01);
(Continued)

(58) Field of Classification Search
CPC ............... B01D 53/0454; F01N 11/002; F01N 2570/14; F01N 2900/1404; F01N 3/0871;
(Continued)

(56) References Cited

U.S. PATENT DOCUMENTS

| 7,104,051 B2 * | 9/2006 | Shimasaki ............ F01N 3/0253 60/274 |
| 2013/0111886 A1 | 5/2013 | Gonze et al. |

(Continued)

OTHER PUBLICATIONS

Great Britain Patent Office, Great Britain Search Report for Great Britain Application No. 1521847.2, dated Feb. 8, 2016.

*Primary Examiner* — Mark Laurenzi
*Assistant Examiner* — Anthony Ayala Delgado
(74) *Attorney, Agent, or Firm* — Lorenz & Kopf, LLP

(57) ABSTRACT

A method and system for operating an aftertreatment system of an internal combustion engine is disclosed. A value of a storage efficiency for the lean nitrogen-oxide trap is determined. A value of an exhaust gas temperature is measured upstream of the lean nitrogen-oxide trap. An electric heated catalyst enabling condition may be fulfilled if the storage efficiency of the lean nitrogen-oxide trap is smaller than a threshold value thereof and the value of the exhaust gas temperature upstream of the lean nitrogen-oxide trap is greater than a lower threshold value and less than an upper threshold value. The electric heated catalyst is activated if the enabling condition is fulfilled. An inhibition enabling condition may be fulfilled if the value of storage efficiency is less than a second threshold value and the electric heated catalyst is deactivated and a denitrification of the lean nitrogen-oxides trap is started.

15 Claims, 3 Drawing Sheets

(51) Int. Cl.
| | |
|---|---|
| *F01N 3/08* | (2006.01) |
| *F01N 3/20* | (2006.01) |
| *F01N 13/00* | (2010.01) |
| *B01D 53/04* | (2006.01) |
| *B01D 53/94* | (2006.01) |
| *F01N 11/00* | (2006.01) |

(52) U.S. Cl.
CPC ......... *F01N 3/0814* (2013.01); *F01N 3/0842* (2013.01); *F01N 3/0871* (2013.01); *F01N 3/0885* (2013.01); *F01N 3/2013* (2013.01); *F01N 3/2026* (2013.01); *F01N 11/002* (2013.01); *F01N 13/009* (2014.06); *F01N 2570/14* (2013.01); *F01N 2900/0416* (2013.01); *F01N 2900/08* (2013.01); *F01N 2900/1404* (2013.01); *F01N 2900/1622* (2013.01); *Y02T 10/26* (2013.01); *Y02T 10/47* (2013.01)

(58) Field of Classification Search
CPC .... F01N 3/0885; F01N 3/2013; F01N 3/2026; F01N 9/00
See application file for complete search history.

(56) References Cited

U.S. PATENT DOCUMENTS

| | | | |
|---|---|---|---|
| 2014/0165535 A1* | 6/2014 | Gonze | F01N 3/0842 60/273 |
| 2016/0061087 A1* | 3/2016 | Nagaoka | B01D 53/9409 73/114.75 |

* cited by examiner

METHOD OF OPERATING AN AFTERTREATMENT SYSTEM OF AN INTERNAL COMBUSTION ENGINE

CROSS-REFERENCE TO RELATED APPLICATION

This application claims priority to Great Britain Patent Application No. 1521847.2, filed Dec. 10, 2015, which is incorporated herein by reference in its entirety.

TECHNICAL FIELD

The present disclosure pertains to a method of operating an aftertreatment system of an internal combustion engine, in particular an aftertreatment system provided with a lean nitrogen-oxides trap (LNT) upstream of a reductant storage device, such as a Selective Catalytic Reduction, and an electric Heated Catalyst (eHC).

BACKGROUND

It is known that exhaust gasses from a compression-engine, such as a diesel engine, typically contains $NO_x$, which consists primarily of nitric oxide (NO) and approximately 5 to 20 percent $NO_2$. Production of $NO_x$ may be particularly problematic when operating lean of stoichiometric as a result of the relatively high levels of oxygen in the exhaust gas stream. To address this issue, an exhaust after-treatment system may include a lean nitrogen-oxides trap (LNT) where a $NO_x$ adsorbent material, such as a zeolite, is disposed.

Once the $NO_x$ adsorbent material in an LNT is saturated, the effectiveness of the LNT decreases substantially, and $NO_x$ may slip past the LNT. For this reason, it can be particularly important for an LNT to have sufficient adsorption capacity available. The efficiency of an LNT may be maintained either by replacing the component or by periodic cleaning or regeneration, but in order to avoid service interruptions, regeneration, and in particular a denitrification ($DeNO_x$) regeneration event is generally preferred.

A $DeNO_x$ regeneration event may be operated by switching the engine from a conventional lean-combustion mode to a rich-combustion mode. When the engine is switched to the rich-combustion mode, the $NO_x$ stored on adsorbent sites of the LNT reacts with reductants contained in the exhaust gas, such as unburned Hydrocarbons (HC), and are desorbed and converted to nitrogen ($N_2$) and ammonia ($NH_3$).

For the purpose of guaranteeing safe ($DeNO_x$) regeneration events, generally, the electronic control unit (ECU) of the internal combustion engine is configured to activate the regeneration events only if the internal combustion engine is operated according to engine operating points confined into a pre-calibrated area, i.e. a so-called rich mode area, of the engine speed-engine torque diagram of the internal combustion engine.

Since this rich purge strategy penalizes the fuel consumption, a need exists for a method that minimizes the fuel penalty optimizing the LNT conversion efficiency and the emission benefits.

SUMMARY

An embodiment of the disclosure provides a method of operating an aftertreatment system of an internal combustion engine, wherein the aftertreatment system includes a lean nitrogen-oxides trap, and an electric heated catalyst placed upstream off the lean nitrogen-oxide trap. A value of a storage efficiency of the lean nitrogen-oxide trap is determined. A value of an exhaust gas temperature is measured upstream of the lean nitrogen-oxide trap. An electric heated catalyst enabling condition is indicated as fulfilled if the measured value of the storage efficiency of the lean nitrogen-oxide trap is smaller than a first predetermined threshold value thereof and the value of the exhaust gas temperature upstream of the lean nitrogen-oxide trap is greater than a first predetermined threshold value thereof and smaller than a second predetermined threshold value thereof. The electric heated catalyst is activated if the electric heated catalyst enabling condition is fulfilled. An inhibition enabling condition is indicated as fulfilled if the value of storage efficiency is smaller than a second predetermined threshold value. The electric heated catalyst is deactivated and a denitrification of the lean nitrogen-oxides trap is started if the inhibition enabling condition is fulfilled.

As a result, it is possible to optimize a regeneration event, such as a denitrification, also during cold start conditions, warming-up the lean nitrogen-oxides trap in order to reach the optimal temperature for allowing a more efficient $NO_x$ reduction and a lower fuel consumption during regeneration events.

According to another aspect of the present disclosure, the method may further include measuring a value of temperature of an engine coolant, and identifying that the electric heated catalyst enabling condition is fulfilled provided that the measured value of temperature of the engine coolant is greater than a predetermined threshold value. In this way, it is possible to avoid $NO_x$ slip during rich purges if they are requested at low temperature.

According to another embodiment of the present disclosure, the method may include determining an actual engine operating point, and identifying that the inhibition enabling condition is fulfilled provided that the actual engine operating point is not included in a predetermined inhibition area. In this way, it is possible to obtain a lower fuel consumption deterioration compared to a standard warm-up.

According to a further aspect of the present disclosure, the method may further include measuring the amount of nitrogen-oxides stored in the lean nitrogen-oxides trap, and stopping the denitrification and activating a time counter to count a lock time when the measured amount of nitrogen-oxides stored in the lean nitrogen-oxides trap is null. In this way, it is possible to minimize the fuel penalty optimizing the number and frequency of denitrifications.

In alternative, the method may further include measuring an amount of energy used by the electric heated catalyst since its last activation, and identifying that the inhibition enabling condition is fulfilled provided that the amount of energy use by the electric heated catalyst is smaller than a predetermined threshold value. In this way, it is possible to minimize the fuel consumption and to avoid denitrifications if the aftertreatment device temperature is too high.

According to a further aspect of the present disclosure, the method may further include identifying that the inhibition enabling condition is not fulfilled provided that the amount of energy used by the electric heated catalyst is greater than a predetermined threshold value, measuring the actual engine operating point if the amount of energy used by the electric heated catalyst is greater than a predetermined threshold value, identifying that a tighten inhibition enabling condition is fulfilled if the actual engine operating point is not included in a tighten inhibition area and the value of the storage efficiency of the lean nitrogen-oxide trap is smaller than a predetermined threshold value, and de-activating the electric heated catalyst and starting a denitrification of the lean nitrogen-oxides trap. In this way, it is possible to minimize the fuel penalty due to rich purges.

According to a further aspect of the present disclosure, the method may further include stopping the denitrification of the lean nitrogen-oxides trap, and activating a time counter to count a lock time if the tighten inhibition enabling condition is not fulfilled. In this way, it is allowed to implement the various embodiments of the present disclosure in the most efficient way.

The proposed solution, achieving basically the same effects of the method described above, may be carried out with the help of a computer program including a program-code for carrying out, when run on a computer, the method described above, and in the form of a computer program product including the computer program. The method can be also embodied as an electromagnetic signal, the signal being modulated to carry a sequence of data bits which represent a computer program to carry out all steps of the method.

A further embodiment of the disclosure provides an apparatus for operating an aftertreatment system of an internal combustion engine, wherein the aftertreatment system includes a lean nitrogen-oxides trap, and an electric heated catalyst placed upstream off the lean nitrogen-oxide trap, the apparatus is configured to determine a value of a storage efficiency of the lean nitrogen-oxide trap, measure a value of an exhaust gas temperature upstream of the lean nitrogen-oxide trap, identify that an electric heated catalyst enabling condition is fulfilled if the measured value of the storage efficiency of the lean nitrogen-oxide trap is smaller than a first predetermined threshold value thereof and the value of the exhaust gas temperature upstream of the lean nitrogen-oxide trap is greater than a first predetermined threshold value thereof and smaller than a second predetermined threshold value thereof, activate the electric heated catalyst if the electric heated catalyst enabling condition is fulfilled, identify that an inhibition enabling condition is fulfilled if the value of storage efficiency is smaller than a second predetermined threshold value, and de-activate the electric heated catalyst and starting a denitrification of the lean nitrogen-oxides trap if the inhibition enabling condition is fulfilled.

As a result, it is possible to optimize a regeneration event, such as a denitrification, also during cold start conditions, warming-up the lean nitrogen-oxides trap in order to reach the optimal temperature for allowing a more efficient $NO_x$ reduction and a lower fuel consumption during regeneration events.

According to another aspect of the present disclosure, the apparatus may be further configured to measure a value of temperature of an engine coolant, and identify that the electric heated catalyst enabling condition is fulfilled provided that the measured value of temperature of the engine coolant is greater than a predetermined threshold value. In this way, it is possible to avoid $NO_x$ slip during rich purges if they are requested at low temperature.

According to another embodiment of the present disclosure, the apparatus may further be configured to determine an actual engine operating point, and identify that the inhibition enabling condition is fulfilled provided that the actual engine operating point is not included in a predetermined inhibition area, in this way, it is possible to obtain a lower fuel consumption deterioration compared to a standard warm-up.

According to a further aspect of the present disclosure, the apparatus may be further configured to measure the amount of nitrogen-oxides stored in the lean nitrogen-oxides trap, and stop the denitrification and activating a time counter to count a lock time when the measured amount of nitrogen-oxides stored in the lean nitrogen-oxides trap is null. In this way, it is possible to minimize the fuel penalty optimizing the number and frequency of denitrifications.

In alternative, the apparatus may be further configured to measure an amount of energy used by the electric heated catalyst since its last activation, and identify that the inhibition enabling condition is fulfilled provided that the amount of energy used by the electric heated catalyst is smaller than a predetermined threshold value. In this way, it is possible to minimize the fuel consumption and to avoid denitrifications if the aftertreatment device temperature is too high.

According to a further aspect of the present disclosure, the apparatus may be further configured to identify that the inhibition enabling condition is not fulfilled provided that the amount of energy used by the electric heated catalyst is greater than a predetermined threshold value, measure the actual engine operating point if the amount of energy used by the electric heated catalyst is greater than a predetermined threshold value, identify that a tighten inhibition enabling condition is fulfilled if the actual engine operating point is not included in a tighten inhibition area and the value of the storage efficiency of the lean nitrogen-oxide trap is smaller than a predetermined threshold value, and de-activate the electric heated catalyst and starting a denitrification of the lean nitrogen-oxides trap. In this way, it is possible to decouple the engine operating points and the aftertreatment system functionality.

According to a further aspect of the present disclosure, the apparatus may be further configured to stop the denitrification of the lean nitrogen-oxides trap, and activate a time counter to count a lock time if the tighten inhibition enabling condition is not fulfilled. In this way, it is allowed to implement the various embodiments of the present disclosure in the most efficient way.

BRIEF DESCRIPTION OF THE DRAWINGS

The present disclosure will hereinafter be described in conjunction with the following drawing figures, wherein like numerals denote like elements.

DETAILED DESCRIPTION OF THE DRAWINGS

The following detailed description is merely exemplary in nature and is not intended to limit the invention or the application and uses of the invention. Furthermore, there is no intention to be bound by any theory presented in the preceding background of the invention or the following detailed description.

Figure 1:
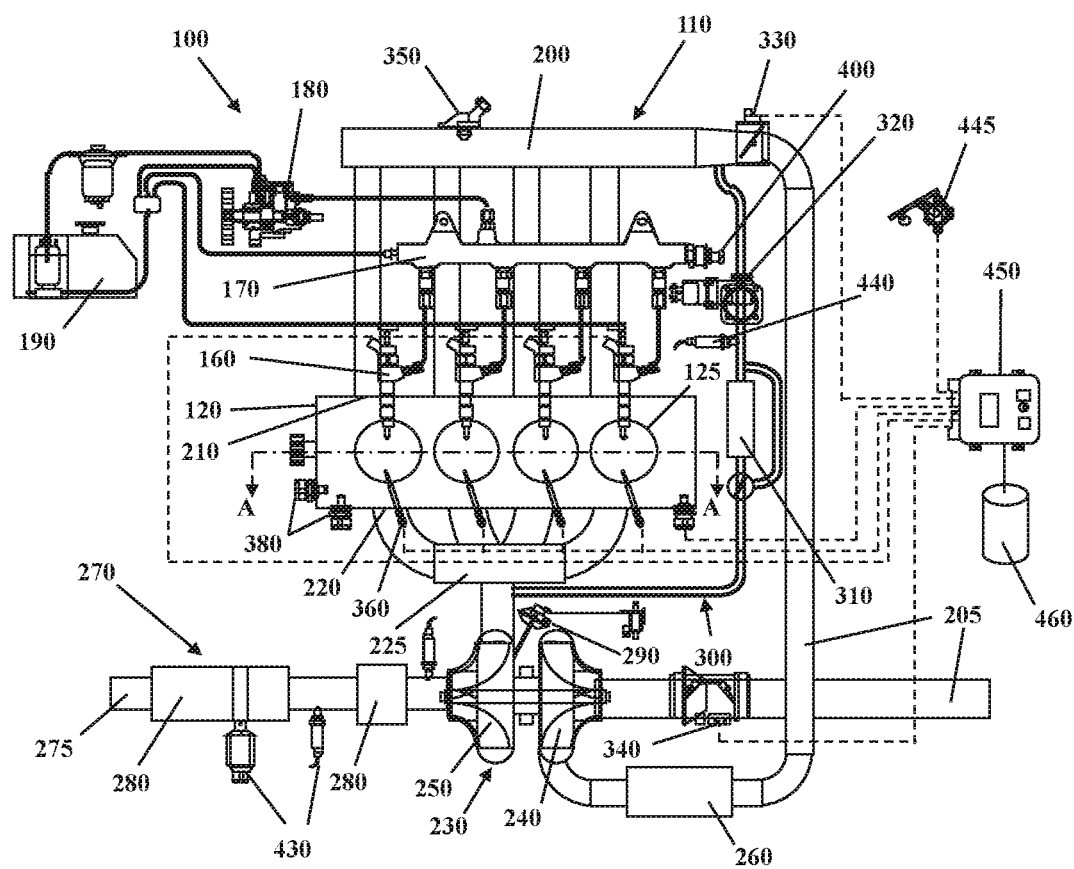
FIG. 1 shows an automotive system.
Figure 2:
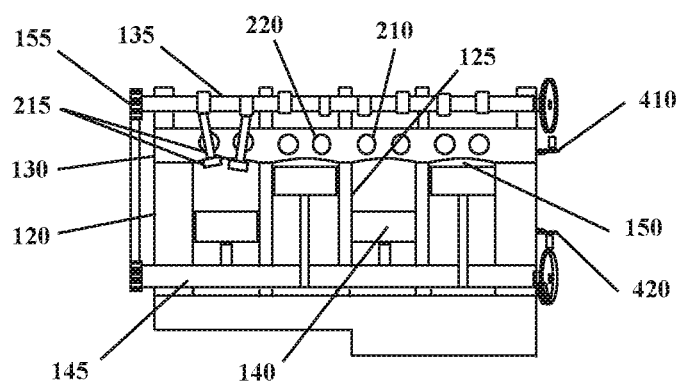
FIG. 2 is a cross-section of an internal combustion engine belonging to the automotive system of FIG. 1.
Figure 3:
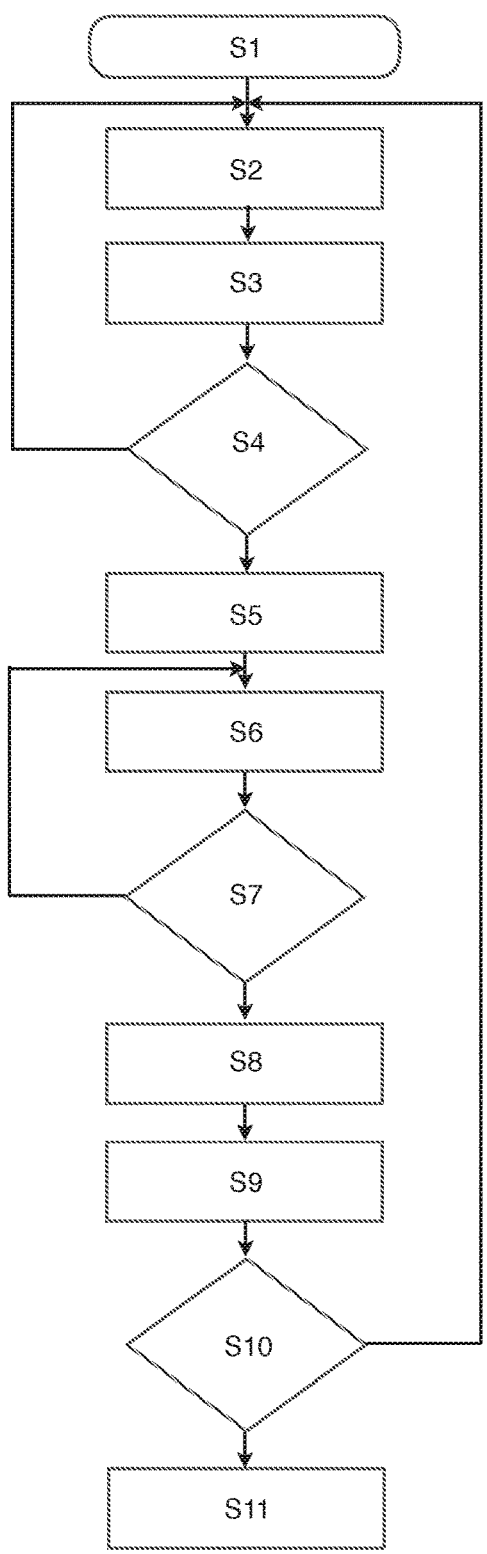
FIG. 3 is a flowchart of a method of operating the aftertreatment system.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 160 cooperates with the piston 140 to define a combustion chamber 150.

A fuel and air mixture (not shown) is disposed in the combustion chamber 170 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190.

Each of the cylinders 125 has at least two valves 230, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon absorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electric Heated Catalyst (eHC) in communication with the exhaust pipe 275 and in particular, an eHC 500 disposed upstream of one or more of the exhaust aftertreatment device 280. The eHC 500 usually includes a conventional catalyst substrate and an additional heated catalyst disc or foil stack which is supported by insulating pins. In the example, the exhaust aftertreatment device 280 includes a lean nitrogen-oxides trap (LNT) 510 and an eHC 500 disposed upstream of the LNT 510, for example close-coupled thereto. The exhaust aftertreatment device 280 may further include a Selective Catalytic Reduction (SCR) 520 catalyst placed downstream of the LNT 510.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445.

Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity. Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally viewed as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like.

Instead of an ECU 450, the automotive system 100 may have a different type of processor to provide the electronic logic, e.g. an embedded controller, an on-board computer, or any processing module that might be deployed in the vehicle.

The ECU 450 may be configured to execute a regeneration event of the LNT 510, for example a DeNO$_x$ regeneration event. A regeneration event of the LNT 510 can be performed by operating a rich combustion phase generated by a plurality of fuel after-injections into cylinders 125 and performed by fuel injectors 160 under management of the engine ECU 450 of the ICE 110. In particular, an after-injection is intended as a type of late injections, i.e. injections of fuel, by the fuel injector 160, into the combustion chamber 150 of the ICE 110 performed after the Top Dead Center (TDC) of the piston, which partially participate to in-chamber combustion.

According to an embodiment of the present disclosure, before executing a regeneration event of the LNT 510 and activating a change in the combustion strategy in order to warm up the aftertreatment system, the ECU 450 may be configured to execute (block S1) an optimization method on the LNT 510, in which the engine operating points may be decoupled from the aftertreatment system functionality, optimizing the LNT 510 conversion efficiency and minimizing the fuel penalty.

The ECU 450 may be configured to determine (block S2) a value of a storage efficiency (Stor_eff) of the LNT 510. The value of storage efficiency may be determined on the basis of the following parameters, the quantity of NO$_x$ downstream of the SCR 520 (NOx$_{tailpipe}$) and the quantity of NO$_x$ upstream of the LNT 510) (NOx$_{eng\_out}$). For example, the value of storage efficiency may be calculated by the following formula:

$$Stor_{eff} = 1 - \frac{NOx_{tailpipe}}{NOx_{eng\_out}}$$

The quantity of NO$_x$ NOx$_{tailpipe}$ may be measured by a NOx sensor disposed downstream of the SCR 520 and the quantity of NO$_x$ NOx$_{eng\_out}$ may be measured by a NOx sensor disposed upstream of the LNT 510.

Once the ECU 450 has determined the value Sto_eff of storage efficiency, the ECU 450 may be configured to determine if the value Stor_eff is smaller than a first predetermined threshold value thereof. The first predetermined threshold value of the storage efficiency may be a minimum value to activate the eHC 500, or any other value predetermined during experimental activities performed on a test bench and stored in the memory system.

The ECU 450 may be further configured to measure (block S3) a value of an exhaust gas temperature upstream of the LNT 510 (T_LNT_up). The value of the exhaust gas temperature upstream of the LNT 510 may be measured by a temperature sensor 540 disposed upstream of the LNT 510. The ECU 450 may be further configured to identifying (block S4) that an eHC enabling condition is fulfilled. The eHC enabling condition is fulfilled if the value Stor_eff of the storage efficiency is smaller than the first predetermined threshold value thereof and the measured value T_LNT_up of the exhaust gas temperature upstream the LNT 510 is greater than a first predetermined threshold value thereof and smaller than a second predetermined threshold value thereof. The first and second predetermined threshold values of the exhaust gas temperature upstream the LNT 510 may be minimum and maximum values of the exhaust gas temperature, respectively, to switch on the eHC 500, and may be values predetermined during experimental activities performed on a test bench and stored in the memory system.

If the eHC enabling condition is fulfilled, the ECU 450 may be further configured to activate the eHC 500 (block S5). The activation of the eHC 500 may be performed providing power to one end of the eHC 500 by an electrical connection, which conducts an electric current to a foil stack of the eHC 500. The foil stack itself determines the electric power of the eHC 500. If the eHC enabling condition is not fulfilled, the ECU 450 may be further configured to re-determine the value (Stor_eff) of the storage efficiency of the LNT 510 (as depicted in block S2), to re-measure the value T_LNT_up of the exhaust gas temperature upstream of the LNT 510 (as depicted in block S3) until the eHC enabling condition is fulfilled (as depicted in block S4).

The ECU 450 may be further configured to determine (block S6) an actual engine operating point, i.e. namely, an engine speed and an engine torque. The ECU 450 is configured to activate a regeneration event only if the ICE 110 is operated according to engine operating points confined into a pre-calibrated area, i.e. a so-called rich mode area, of the engine speed engine torque diagram of the ICE 110. In particular, the rich mode area is inferiorly delimited by a lower curve, in order to guarantee that under a predetermined lower threshold value of the engine torque (for example 50 Nm) the regeneration event can be stopped or avoided, i.e. inhibition area. The rich mode area and the inhibition area are predetermined during experimental activities performed on a test bench and stored in the memory system.

The ECU 450 may be further configured to identify (block S7) that an inhibition enabling condition is fulfilled. The inhibition enabling condition is fulfilled if the actual engine operating point is outside from the inhibition area and a DeNO$_x$ regeneration event may be necessary, i.e. when the value Stor_eff of the storage efficiency is smaller than a predetermined threshold value thereof. The predetermined threshold value of the storage efficiency may be a minimum value to execute a DeNO$_x$ regeneration event, or any other value predetermined during experimental activities performed on a test bench and stored in the memory system.

If the inhibition enabling condition is fulfilled, the ECU 450 may be further configured to de-activate the eHC 500 and to start a DeNO$_x$ regeneration event (block S8). If the inhibition condition is not fulfilled, the ECU 450 may be further configured to re-determine the actual engine operating point (as above disclosed and depicted in block S6), until the inhibition condition is fulfilled (as depicted in block S7).

The ECU 450 may be further configured to determine an amount of NO$_x$ stored in LNT 510 (block S9). The amount of NO$_x$ stored in the LNT 510 may be determined on the basis of a measurement of the NOx content in the exhaust gas upstream and downstream of the LNT 510 measured, by way of an example, by a first NOx sensor disposed upstream of the LNT 510 and a second NOx sensor disposed downstream of the LNT 510, respectively.

The ECU 450 may be further configured to determine when the determined amount of NO$_x$ stored in the LNT 510 gets null (block S10). If the determined amount of NO$_x$ stored in the LNT 510 is null, the ECU 450 may further be configured to stop the DeNO$_x$ regeneration event and to activate a time counter (block S11) to count a lock time. The lock time may be a predetermined period of time during which any activation of eHC 500 or any DeNO$_x$ regeneration event is inhibited. The lock time may be a value predetermined during experimental activities performed on a test bench and stored in the memory system.

According to another embodiment of the present disclosure, the ECU 450 may be further configured to measure (block S3) a value of temperature of an engine coolant T_ECT. The value T_ECT of the temperature of the engine coolant may be measured by a temperature sensor disposed in an engine coolant system. According to this embodiment, the eHC enabling condition is fulfilled (block S7) also if the measured value T_ECT of temperature of the engine coolant is greater than a predetermined threshold value T_ECT_min thereof. The predetermined threshold value T_ECT_min of the engine coolant may be the minimum value of engine coolant temperature to switch on the eHC 500 and may be a value predetermined during experimental activities performed on a test bench and stored in the memory system.

Figure 4:
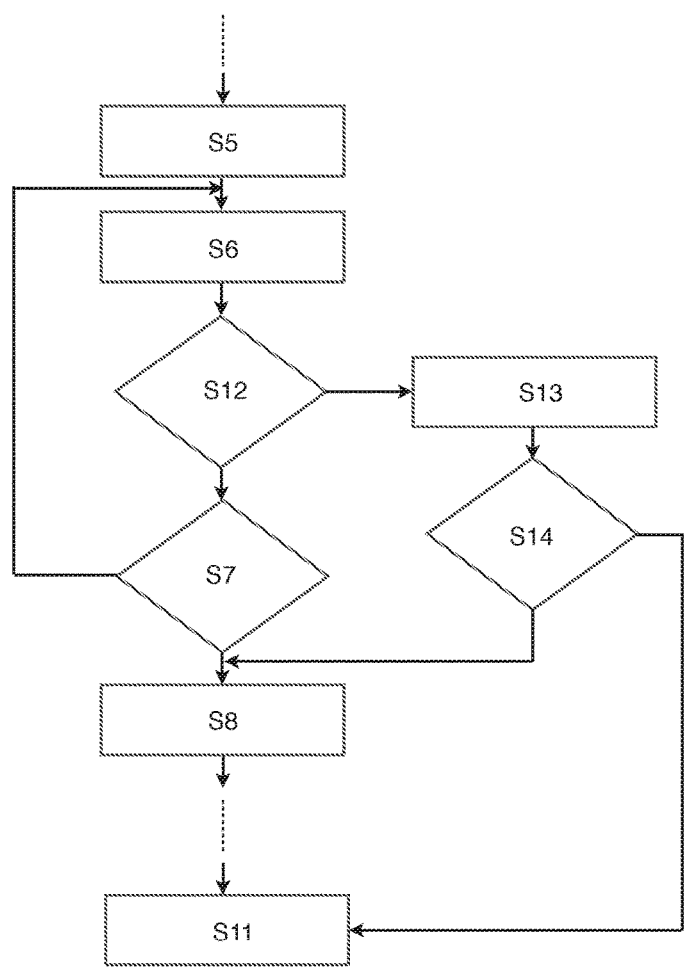
FIG. 4 is a flowchart similar to FIG. 3, illustrating a modified method of operating the aftertreatment system.
Figure 5:
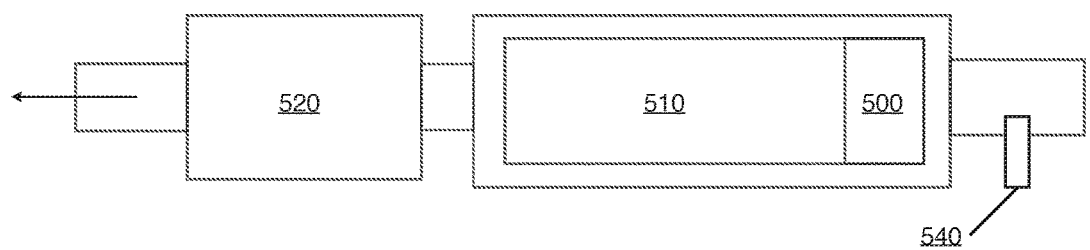
FIG. 5 is a schematic illustration of the exhaust gas aftertreatment devices according to an embodiment of the present solution.

According to another embodiment of the present disclosure (FIG. 4), after the activation of the eHC 500 (block S5), the ECU 450 may be further configured to measure an amount of energy used by the eHC 500 since its last activation (block S6). The ECU 450 is further configured to determine (block S12) when the amount of energy used by the eHC 500 since the last activation is smaller than a predetermined threshold value En_lim thereof. The predetermined threshold value En_lim of the amount of energy may be a value predetermined during experimental activities performed on a test bench and stored in the memory system.

If the amount of energy used by the eHC 500 since the last activation is smaller than the predetermined threshold value En_lim, the ECU 450 may be configured to identify that the inhibition enabling condition is fulfilled (as above disclosed and depicted at the block S7). If the amount of energy used by the eHC 500 since the last activation is greater than the threshold value En_lim, the ECU 450 may be configured to determine the actual engine operating point (block S13) and to identify that a tighten inhibition enabling condition is fulfilled (block S14). The tighten inhibition enabling condition is fulfilled if the actual engine operating point is not included in a tighten inhibition area and a $DeNO_x$ regeneration event is necessary, i.e. if the value Stor_eff is smaller than a predetermined threshold value. The predetermined threshold value Stor_eff of the storage efficiency may be a minimum value to execute a $DeNO_x$ regeneration event, or any other value predetermined during experimental activities performed on a test bench and stored in the memory system.

The tighten inhibition area is part of the inhibition area and is superiorly delimited by an upper curve, in order to guarantee that under a predetermined upper threshold value of the engine torque, lower than the upper threshold value of the inhibition area, the $DeNO_x$ regeneration events can be stopped or avoided. The tighten inhibition is predetermined during experimental activities performed on a test bench and stored in the memory system.

If the tighten inhibition enabling condition is fulfilled, the ECU 450 may be further configured to de-activate the eHC 500 and to start a $DeNO_x$ regeneration event (block S8). If the tighten inhibition enabling condition is not fulfilled, the ECU 450 may be further configured to stop the $DeNO_x$ regeneration event and to activate a time counter to count a lock time (block S11).

Testing and simulations results conducted by the Applicant show that the eHC activation leads to a lower fuel consumption deterioration compared to a standard warm up procedure, considering the same activation strategy. Moreover, the optimization method on the LNT above described, implemented in order to increase the LNT upstream temperature during the first part of a $DeNO_x$ regeneration event, leads to a negligible improvement in terms of $NO_x$ tail pipe and it avoids $NO_x$ split during rich purges events, especially if they are requested at low temperature.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an aftertreatment system of an internal combustion engine having a lean nitrogen-oxides trap and an electric heated catalyst placed upstream of the lean nitrogen-oxide trap, the method comprising:
   determining a value of a storage efficiency of the lean nitrogen-oxide trap;
   measuring a value of an exhaust gas temperature upstream of the lean nitrogen-oxide trap;
   indicating that an electric heated catalyst enabling condition is fulfilled if the determined value of the storage efficiency of the lean nitrogen-oxide trap is smaller than a first predetermined threshold value thereof and the measured value of the exhaust gas temperature upstream of the lean nitrogen-oxide trap is greater than a first predetermined threshold value thereof and less than a second predetermined threshold value thereof;
   activating the electric heated catalyst if the electric heated catalyst enabling condition is fulfilled;
   identifying that an inhibition enabling condition is fulfilled if the value of storage efficiency is less than a second predetermined threshold value; and
   de-activating the electric heated catalyst and starting a denitrification of the lean nitrogen-oxides trap if the inhibition enabling condition is fulfilled.

2. The method according to claim 1, further comprising:
   measuring a value of temperature of an engine coolant;
   indicating that the electric heated catalyst enabling condition is fulfilled if the measured value of temperature of the engine coolant is greater than a predetermined threshold value.

3. The method according to claim 2, further comprising:
   determining an actual engine operating point; and
   indicating that the inhibition enabling condition is fulfilled if the actual engine operating point is outside from a predetermined inhibition area.

4. The method according to claim 3, further comprising:
   determining the amount of nitrogen-oxides stored in the lean nitrogen-oxides trap; and
   stopping the denitrification and activating a time counter to count a lock time when the determined amount of nitrogen-oxides stored in the lean nitrogen-oxides trap gets null.

5. The method according to claim 1, further comprising:
   measuring an amount of energy used by the electric heated catalyst since its last activation; and indicating the inhibition enabling condition is fulfilled if said measured amount of energy used by the electric heated catalyst is less than a predetermined threshold value.

6. The method according to claim 5, further comprising:
identifying that the inhibition enabling condition is not fulfilled if said measured amount of energy used by the electric heated catalyst is greater than a predetermined threshold value;
determining the actual engine operating point if said measured amount of energy used by the electric heated catalyst is greater than a predetermined threshold value;
identifying that a tighten inhibition enabling condition is fulfilled if the actual engine operating point is not comprised in a tighten inhibition area and the value of the storage efficiency of the lean nitrogen-oxide trap is less than a predetermined threshold value; and
de-activating the electric heated catalyst and starting a denitrification of the lean nitrogen-oxides trap.

7. The method according to claim 5, further comprising:
stopping the denitrification of the lean nitrogen-oxides trap; and
activating a time counter to count a lock time if the tighten inhibition enabling condition is not fulfilled.

8. A non-transitory computer readable medium comprising program code, when run on a computer, is configured to perform the method according to claim 1.

9. An aftertreatment system comprising:
a lean nitrogen oxides trap;
an electric heated catalyst placed upstream of the lean nitrogen-oxide trap;
a temperature sensor configured to measure a value of the exhaust gas temperature upstream of the lean nitrogen oxides trap; and
an electronic control unit configured to:
determine a value of a storage efficiency of the lean nitrogen-oxide trap;
measure a value of an exhaust gas temperature upstream of the lean nitrogen-oxide trap;
indicate that an electric heated catalyst enabling condition is fulfilled if the determined value of the storage efficiency of the lean nitrogen-oxide trap is smaller than a first predetermined threshold value thereof and the measured value of the exhaust gas temperature upstream of the lean nitrogen-oxide trap is greater than a first predetermined threshold value thereof and less than a second predetermined threshold value thereof;
activate the electric heated catalyst if the electric heated catalyst enabling condition is fulfilled;
identify that an inhibition enabling condition is fulfilled if the value of storage efficiency is less than a second predetermined threshold value; and
de-activate the electric heated catalyst and starting a denitrification of the lean nitrogen-oxides trap if the inhibition enabling condition is fulfilled.

10. The aftertreatment system of claim 9, wherein the electronic control unit is further configured to:
measure a value of temperature of an engine coolant;
indicate that the electric heated catalyst enabling condition is fulfilled if the measured value of temperature of the engine coolant is greater than a predetermined threshold value.

11. The aftertreatment system of claim 10, wherein the electronic control unit is further configured to:
determine an actual engine operating point; and
indicate that the inhibition enabling condition is fulfilled if the actual engine operating point is outside from a predetermined inhibition area.

12. The aftertreatment system of claim 11, wherein the electronic control unit is further configured to:
determine the amount of nitrogen-oxides stored in the lean nitrogen-oxides trap; and
stop the denitrification and activating a time counter to count a lock time when the determined amount of nitrogen-oxides stored in the lean nitrogen-oxides trap gets null.

13. The aftertreatment system of claim 9, wherein the electronic control unit is further configured to:
measure an amount of energy used by the electric heated catalyst since its last activation; and
indicate the inhibition enabling condition is fulfilled if said measured amount of energy used by the electric heated catalyst is less than a predetermined threshold value.

14. The aftertreatment system of claim 13, wherein the electronic control unit is further configured to:
identify that the inhibition enabling condition is not fulfilled if said measured amount of energy used by the electric heated catalyst is greater than a predetermined threshold value;
determine the actual engine operating point if said measured amount of energy used by the electric heated catalyst is greater than a predetermined threshold value;
identify that a tighten inhibition enabling condition is fulfilled if the actual engine operating point is not comprised in a tighten inhibition area and the value of the storage efficiency of the lean nitrogen-oxide trap is less than a predetermined threshold value; and
de-activate the electric heated catalyst and starting a denitrification of the lean nitrogen-oxides trap.

15. The aftertreatment system of claim 13, wherein the electronic control unit is further configured to:
stop the denitrification of the lean nitrogen-oxides trap; and
activate a time counter to count a lock time if the tighten inhibition enabling condition is not fulfilled.

* * * * *